United States Patent
Smotkin et al.

[19]

[11] Patent Number: 5,856,036
[45] Date of Patent: Jan. 5, 1999

[54] SINGLE PHASE TERNARY PT-RU-OS CATALYSTS FOR DIRECT OXIDATION FUEL CELLS

[75] Inventors: Eugene S. Smotkin, Chicago, Ill.; Kevin L. Ley, Berkshire, United Kingdom; Cong Pu, Farington Hills, Mich.; Renxuan Liu, Chicago, Ill.

[73] Assignee: Illinois Institute of Technology, Chicago, Ill.

[21] Appl. No.: 815,102

[22] Filed: Mar. 11, 1997

[51] Int. Cl.[6] .................................................. H01M 4/92
[52] U.S. Cl. .............................. 429/40; 429/44; 204/293; 502/326
[58] Field of Search ...................... 429/44, 40; 502/101, 502/326; 204/209 F, 293; 420/466

[56] References Cited

U.S. PATENT DOCUMENTS

| | | | |
|---|---|---|---|
| 3,506,494 | 4/1970 | Adlhart | 420/466 |
| 4,049,583 | 9/1977 | Lauder . | |
| 4,127,468 | 11/1978 | Alfenaar et al. . | |
| 4,536,482 | 8/1985 | Carcia . | |
| 4,537,839 | 8/1985 | Cameron | 429/20 |
| 4,707,229 | 11/1987 | Dempsey et al. | 204/129 |
| 4,781,803 | 11/1988 | Harris et al. | 204/129 |
| 4,880,711 | 11/1989 | Luczak et al. . | |
| 5,012,027 | 4/1991 | Abrevaya et al. . | |
| 5,208,207 | 5/1993 | Stonehart et al. . | |
| 5,225,391 | 7/1993 | Stonehart et al. . | |
| 5,286,580 | 2/1994 | Ippommatsu et al. . | |
| 5,500,307 | 3/1996 | Anzai et al. . | |

OTHER PUBLICATIONS

R. Liu et al.: *Bifunctional Pt–Ru–Os Ternary Alloys: Improved Pt–Based Anodes For Direct Methanol Fuel Cells*, Electrochemical Society Proceedings, vol. 96–8, pp. 341–355 No date available.

Ley et al., "Methanol Oxidation on Single–Phase Pt–Ru–Os Ternary Alloys," J. Electrochem. Soc., vol. 144, No. 5, pp. 1543–1548, May 1997.

Liu et al., "Bifunctional Pt–Ru–Os Ternary Alloys: Improved Pt–Based Anodes . . . " in Sixth International Symposium on Electrode Process, proceeding of symposium sponsored by the Electrochemical Society, May 1996 in Los Angles, CA.

*Primary Examiner*—Kathryn L. Gorgos
*Assistant Examiner*—Carol Chaney
*Attorney, Agent, or Firm*—Speckman Pauley Petersen & Fejer

[57] ABSTRACT

A catalyst composition for use in electrochemical reactor devices comprising platinum, ruthenium, and osmium and having a single phase crystal structure comprising a face centered cubic unit cell. In accordance with a particularly preferred embodiment, in atomic percentages, platinum comprises about 65% of the catalyst composition, ruthenium comprises about 25% of the catalyst composition, and osmium comprises about 10% of the catalyst composition.

6 Claims, 6 Drawing Sheets

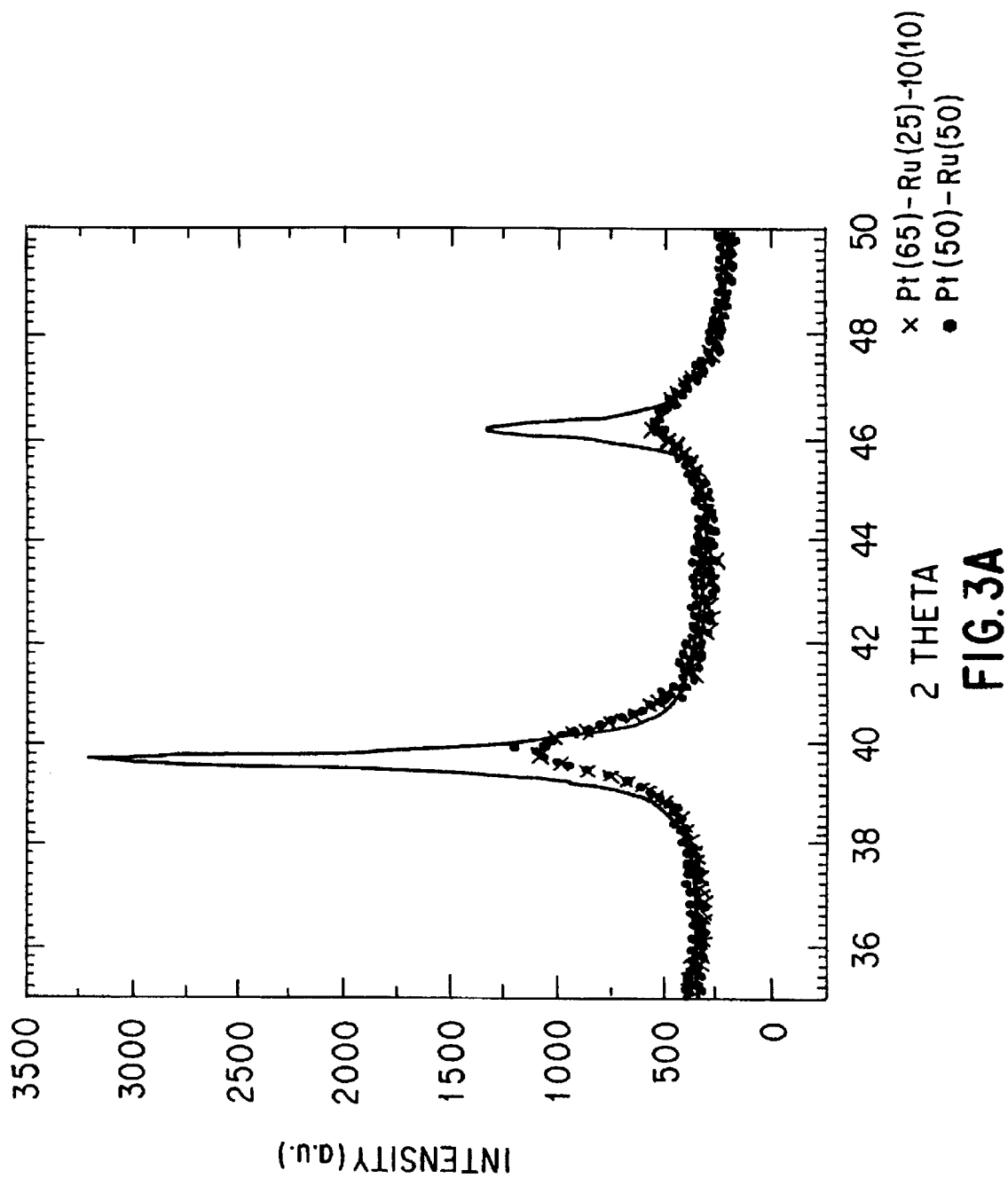

SINGLE PHASE TERNARY PT-RU-OS CATALYSTS FOR DIRECT OXIDATION FUEL CELLS

BACKGROUND OF THE INVENTION

1. Field of the Invention

This invention relates to a catalyst for use in direct oxidation fuel cells or other electrochemical reactor devices operating in the temperature range up to about 200° C. More particularly, this invention relates to a single phase, high surface area catalyst comprising platinum, ruthenium and osmium.

2. Description of Prior Art

State-of-the-art catalysts for the electro-oxidation of hydrocarbon fuels such as methanol are based on platinum (Pt)-ruthenium (Ru) alloys. The overall electrochemical reaction for the oxidation of methanol on a fuel cell anode, the fuel electrode, is:

$$CH_3OH + H_2O \rightarrow CO_2 + 6H^+ + 6e^-$$

Platinum is a good catalyst for the adsorption and dehydrogenation of methanol molecules but it is rapidly poisoned as the catalyst surface becomes blocked with the adsorbed intermediate, carbon monoxide. It is known that $H_2O$ plays a key role in the removal of such poisoning species from its role in the rate determining process of CO removal in accordance with the following reactions:

$$Pt + H_2O \rightarrow Pt-OH + H^+ + e^-$$

$$Pt-CO + Pt-OH \rightarrow 2Pt + CO_2 + H^+ + e^-$$

However, platinum does not adsorb $H_2O$ species well at potentials where fuel electrodes operate in direct oxidation fuel cells. The result is that platinum is a poor catalyst for direct oxidation fuel cells and the steady-state activity necessary for fuel oxidation is poor.

Platinum-ruthenium, as previously stated, is presently the state-of-the-art catalyst for direct oxidation of methanol. The success of the platinum-ruthenium catalyst is based on the ability of ruthenium to adsorb $H_2O$ species at potentials where methanol is adsorbing on the platinum and facilitate the carbon monoxide removal reaction. This dual function of the alloy catalyst's surface, that is, to adsorb both reactants on the catalyst surface on adjacent metal sites, is known as the bifunctional mechanism in accordance with the following reaction:

$$Pt-CO + Ru-OH \rightarrow Pt + Ru + CO_2 + H^+ + e^-$$

The combination of platinum and ruthenium adjacent metal sites forms an active site on the catalyst surface where methanol is oxidized in a non-poisoning way. The term "pair site" is used herein to describe the situation where adjacent metal atoms are adsorbing the methanol and water reactants. Appreciable rates of methanol oxidation are obtainable only in the presence of a high pair density. It follows that a single phase alloy crystal structure is desirable because the density of pair sites will be maximized on an alloy surface. The activity of the pair site, however, is the most important parameter. For example, several alloy surfaces with high pair site densities are known, but the activity for methanol oxidation is only appreciable on some of these surfaces. That is, if the catalytic activity of each pair site is low, then the resulting methanol oxidation will be poor. The elements that constitute the pair site are, thus, critical.

The best known catalysts for methanol oxidation are Pt—Ru, Pt—Sn, Pt—Mo, and Pt—Re. It is known that osmium (Os) adsorbs water at the most negative potential of all the noble metals, albeit still in the range of interest for fuel electrodes in direct oxidation fuel cells. As a result, osmium is a primary candidate for alloying with platinum to produce a good methanol oxidation catalyst. However, osmium possesses a maximum solubility of 20 at. % (atomic percentage) in platinum. Thus, while a pair site of Pt—Os may be intrinsically more active than a pair site of Pt—Ru, the limited solubility limits the pair site density to values smaller than that found in Pt—Ru. In addition, osmium can form $OsO_4$, which is toxic to humans, under certain conditions.

U.S. Pat. No. 4,880,711 to Luczak et al. teaches a ternary alloy catalyst for fuel cells comprising platinum and gallium. Additional elements of the catalyst include chromium, cobalt, nickel and/or mixtures thereof. The alloy catalyst is indicated to require at least about 50% platinum to be an effective catalytic material; however, other elements in the same periodic group, namely iridium, rhodium, osmium and ruthenium are indicated to be substitutable for a portion of the platinum.

U.S. Pat. No. 4,127,468 to Alfenaar et al. teaches a process for producing metal electrodes in which a basis-metal electrode comprising a basis-metal which is present in a finely divided or porous state and which is selected from the group consisting of the noble metals from Groups IB, IIB, or VII of the Periodic Table of the Elements, or an alloy of at least one of said metals, is contacted with a solution containing an alloying element. The alloying element is selected from the group consisting of an element from Groups IIIA, IVA, VA, VIA, VII, IB, IIB, VIIB or combinations thereof, of the Periodic Table of the Elements. The alloying-element compound is reduced in situ to form a free-alloying element, whereby the alloying element forms an alloy with the basis-metal. Preferred basis-metals include palladium, platinum, palladium-platinum, and platinum-iridium.

U.S. Pat. No. 5,208,207 to Stonehart et al. teaches an electrocatalyst comprising an inorganic support and a ternary alloy essentially consisting of platinum-palladium-ruthenium supported on the support. U.S. Pat. No. 5,225,391 to Stonehart et al. teaches an electrocatalyst comprising an inorganic support and a four-element alloy consisting essentially of platinum, nickel, cobalt and manganese supported on the inorganic support. U.S. Pat. No. 5,286,580 to Ippommatsu et al. teaches a fuel electrode for a high temperature solid electrolyte fuel cell comprising ruthenium, osmium, rhodium or iridium or an alloy thereof.

None of the prior art of which we are aware teaches or suggests the importance of the crystal structure of the disclosed catalysts.

SUMMARY OF THE INVENTION

It is an object of this invention to provide a catalyst that can be used in direct oxidation fuel cells or other electrochemical reactor devices operating in the temperature range up to about 200° C.

It is another object of this invention to provide a platinum catalyst for use in direct oxidation fuel cells or other electrochemical reactor devices which is capable of adsorption and dehydrogenation of methanol molecules without poisoning by adsorbed intermediates such as carbon monoxide.

It is yet another object of this invention to provide a platinum-based catalyst for use in direct oxidation fuel cells which is superior in performance to known platinum-ruthenium direct oxidation fuel cell catalysts.

It is yet another object of this invention to provide a fuel electrode catalyst for direct electrochemical oxidation of organic molecules/fuels such as methanol, ethanol, ethylene glycol, formaldehyde, formic acid, sodium formate, hydrazine, acetaldehyde, trimethoxymethane, etc. in a direct oxidation fuel cell.

It is still another object of this invention to provide a fuel electrode catalyst for an electrochemical reactor/synthesizer of chemicals such as aldehydes, carboxylic acids, etc., by means of the electro-oxidation of appropriate organics, for example, alcohols.

These and other objects of this invention are achieved by a catalyst composition for use in electrochemical reactor devices comprising the elements platinum, ruthenium and osmium and having a single phase crystal structure comprising a face centered cubic unit cell. More particularly, the catalyst composition of this invention is a single phase, high surface area catalyst, the catalyst particles of which possess a single crystal structure, face centered cubic unit cell, with the elements platinum, ruthenium and osmium substituted into the crystal structure. We have found that when platinum, ruthenium and osmium are substituted into a face centered cubic crystal structure, a highly active catalytic surface for the electrochemical oxidation of molecules such as methanol is created, the catalytic composition producing a synergistic increase in activity of the pair sites which more than compensates for the decrease in pair site density.

BRIEF DESCRIPTION OF THE DRAWINGS

These and other objects and features of this invention will be better understood from the following detailed description taken in conjunction with the drawings wherein.

DESCRIPTION OF PREFERRED EMBODIMENTS

The catalyst composition of this invention can be used in direct oxidation fuel cells or other electrochemical reactor devices operating in the temperature range up to about 200° C. The primary application for this invention is in direct oxidation fuel cells which are electrochemical devices that convert the chemical energy associated with fuels, such as methanol or other alcohols, or ethers, such as trimethoxymethane, into electricity. Other applications for this invention include use in electrochemical reactors for the synthesis of industrial important chemicals such as aldehydes and carboxylic acids.

Electrochemical devices, such as direct oxidation fuel cells, comprise an electrolyte, an air (or oxygen) electrode, and a fuel electrode. Fuel cells utilizing the new catalyst composition of this invention for the fuel electrode significantly improve upon the performance associated with existing state-of-the-art catalyst compositions.

The catalyst composition of this invention is a single phase, high surface area catalyst comprising the elements platinum, ruthenium and osmium. The important features of the catalyst composition of this invention are (1) the single phase nature of the catalyst structure whereby the catalyst particles possess a single crystal structure (face centered cubic unit cell) with the elements platinum, ruthenium and osmium substituted into the crystal structure; and (2) the elements platinum, ruthenium, and osmium substituted into the crystal structure. The innovation of this catalyst relative to state-of-the-art catalysts currently in use is the synergism created when the above two concepts are combined. The synergism created by this combination is discussed hereinbelow.

The novel feature of the catalyst composition of this invention is the synergism created when platinum, ruthenium and osmium are substituted into a face centered cubic crystal structure. The structure that results creates a highly active catalytic surface for the electrochemical oxidation of molecules such as methanol. As previously stated, state-of-the-art catalysts for the electro-oxidation of methanol are based on platinum-ruthenium alloys. And although platinum is a good catalyst for the adsorption and dehydrogenation of methanol molecules, it is rapidly poisoned as the catalyst surface becomes blocked with the adsorbed intermediate, carbon monoxide. As also previously stated, it is known that water plays a key role in the removal of such poisoning species, but, unfortunately, platinum does not adsorb water species well at potentials where fuel electrodes operate in direct oxidation fuel cells. As a result, platinum is a poor catalyst for direct oxidation fuel cells and the steady-state activity for fuel oxidation is poor.

Figure 1:
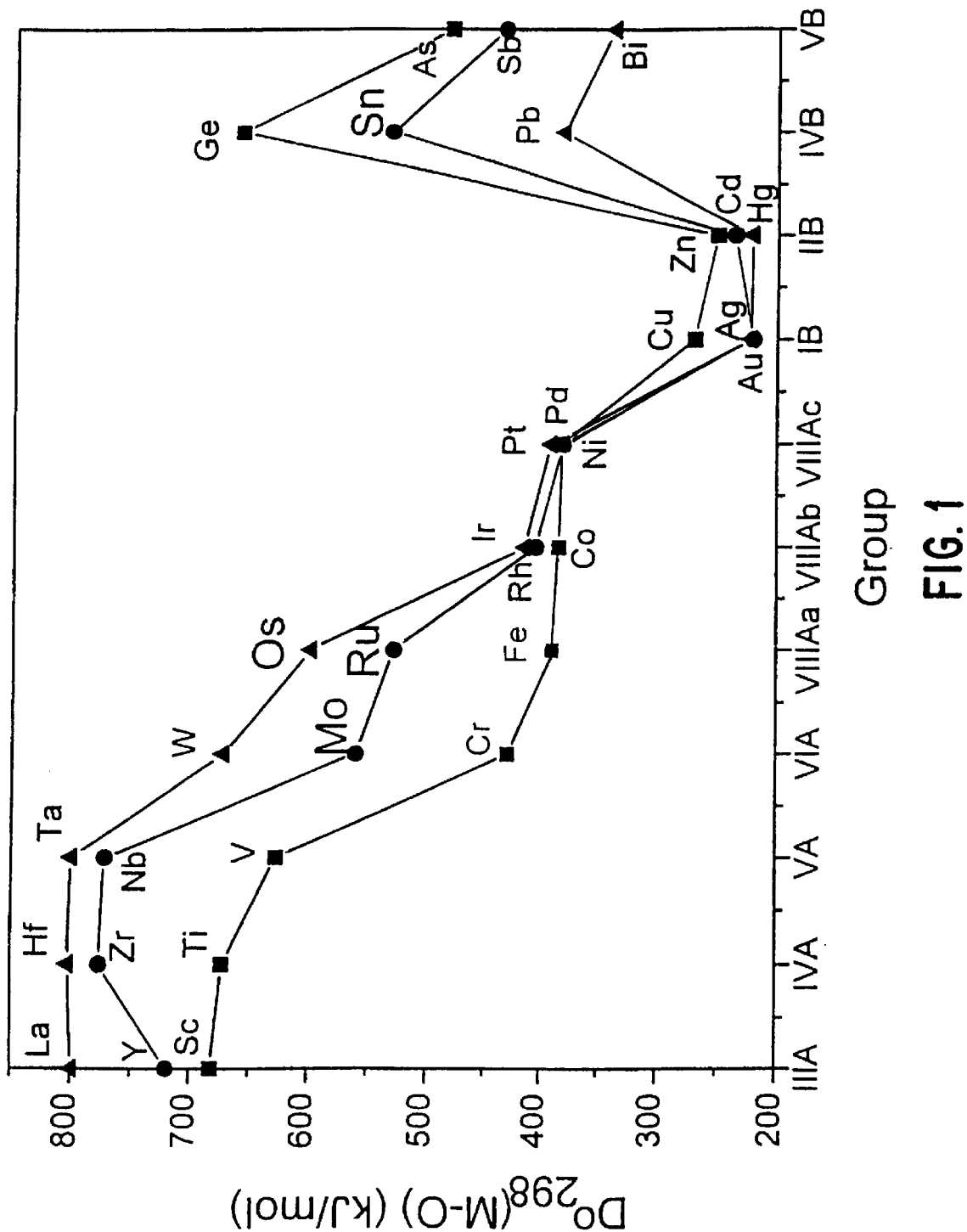
FIG. 1 is a diagram showing the strength of various metal-oxygen bonds as a function of group number across the periods of transition elements in the Periodic Table of the Elements.

Platinum-ruthenium is presently the state-of-the-art catalyst for direct oxidation of methanol, the ruthenium adsorbing water species at potentials where methanol is adsorbing on the platinum, thereby facilitating the CO removal reaction. The combination of platinum and ruthenium adjacent metal sites forms an active site on the catalyst's surface where methanol can be oxidized in a non-poisoning way. As previously stated, a high pair site density is a prerequisite if appreciable rates of methanol oxidation are to be observed. Consequently, a single phase alloy crystal structure is desirable because the density of pair sites will be maximized on the alloy surface. The activity of the pair site, however, is the most important parameter and the elements that constitute the pair site are also critical. The catalytic activity of each pair site is controlled, at least in part, by the strength of adsorption of both the reactants, that is, methanol on platinum and water on the adjacent metal site. FIG. 1 shows the correlations found between the metal-oxygen bond strength and catalytic performance for methanol oxidation. FIG. 1 plots the strength of various metal-oxygen bonds as a function of group number across the periods of transition elements in the Periodic Table. The best known catalysts for methanol oxidation are platinum-ruthenium, platinum-tin, platinum-molybdenum, and platinum-rhenium. FIG. 1 shows that all of these elements possess metal-oxygen bond strengths in the range of 500–650 kJ/MOL. From this data, it can be seen that an optimum strength of binding of oxygen to these metals is a prerequisite to high methanol oxidation activity. FIG. 1 also shows that osmium also lies in the range of 500–650 kJ/MOL of metal-oxygen bond strengths.

It is known that osmium adsorbs water at the most negative potential of all the noble metals, albeit still in the range of interest for fuel electrodes in direct oxidation fuel cells. Based on this data, it would appear that osmium is a primary candidate for alloying with platinum to produce a good methanol oxidation catalyst. Indeed, platinum-osmium binary catalysts have been reported to show enhanced activity for methanol oxidation relative to platinum. However, the maximum solubility of osmium in platinum is 20 atomic %. Thus, although a pair site of platinum-osmium may be intrinsically more active than platinum-ruthenium, the limited solubility limits the pair site density to values smaller than that found in platinum-ruthenium.

Ruthenium, by comparison, possesses significant solubility of up to 60 atomic % in platinum. Thus, in the platinum-ruthenium binary system, the ideal ratio of 50 atomic % platinum to 50 atomic % ruthenium can be realized.

Figure 2:
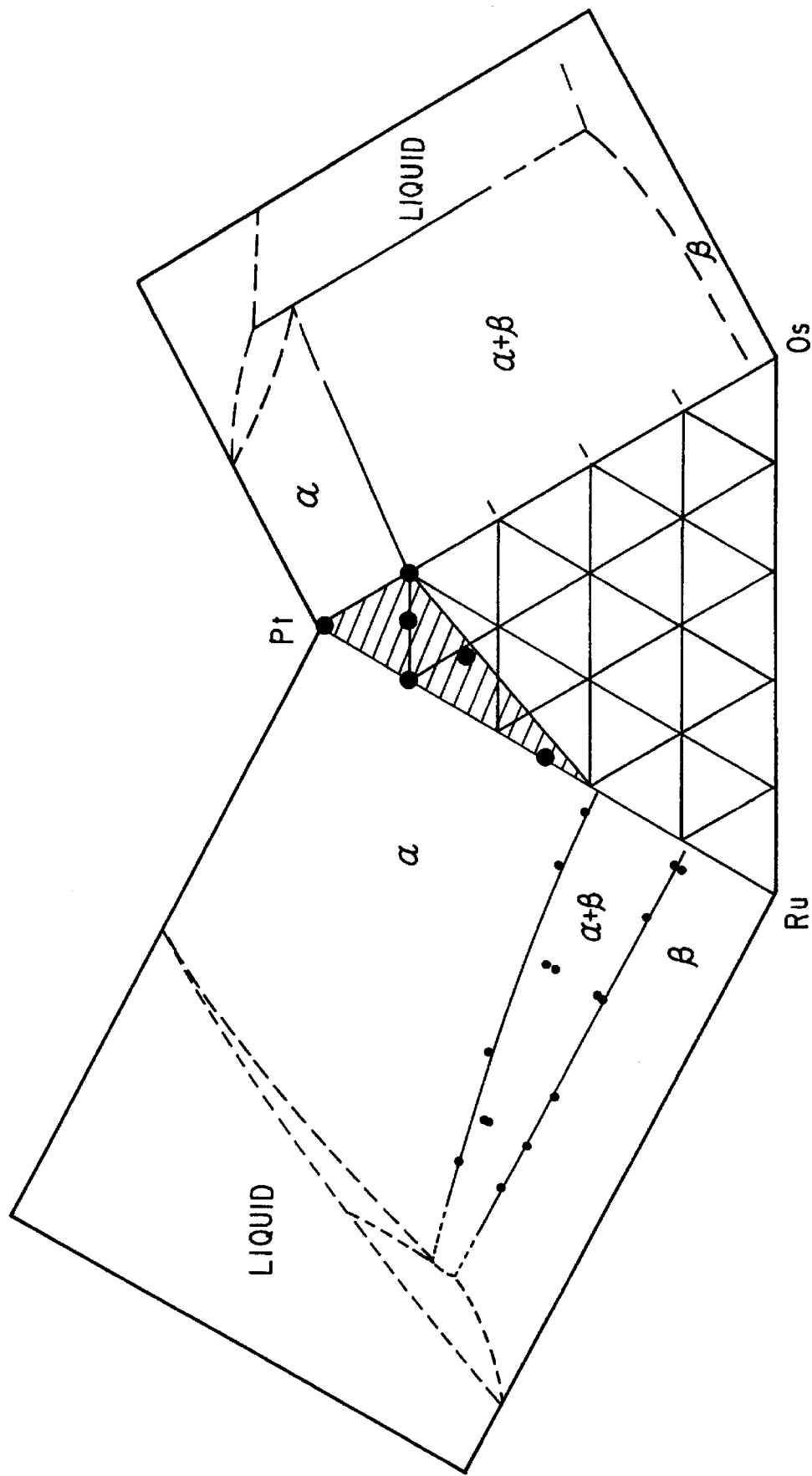
FIG. 2 shows the ternary platinum-ruthenium-osmium system of this invention.

We have determined that, by alloying both osmium and ruthenium into the face centered cubic unit cell structure of platinum, the pair density of active sites can be increased. FIG. 2 shows the ternary platinum-ruthenium-osmium system that results when the platinum-ruthenium and platinum-osmium binary systems are combined. Also shown in FIG. 2 is the catalytically active face centered cubic unit cell region of platinum-ruthenium-osmium compositions of our invention. All of the platinum-ruthenium-osmium compositions within the highlighted region shown in FIG. 2 possess the required single phase crystal structure of this invention. A platinum-ruthenium-osmium catalyst that is ruthenium and/or osmium rich, that is, outside of the highlighted region, possesses a hexagonal crystal structure and, thus, is not catalytically active for the applications of the catalyst composition of this invention.

In accordance with a particularly preferred embodiment of this invention, we have found that the composition platinum (65)-ruthenium (25)-osmium (10) (numbers in parenthesis are atomic percentages) to be a superior methanol oxidation catalyst to platinum-ruthenium. Despite the pair density being lower for the ternary alloy, there is a synergistic increase in activity of these pair sites which more than compensates for the decrease in pair site density. The combination of ruthenium and osmium substituted into the structure of platinum appears to modify the dynamic of methanol and water adsorption on the catalyst in a favorable manner. This may be due to electronic effects associated with alloying these components with platinum. Such effects may also modify the binding strength of adsorbed intermediates of methanol oxidation such as carbon monoxide, making carbon monoxide easier to remove on the ternary alloy. Thus, the single phase platinum-ruthenium-osmium ternary alloy catalyst compositions of this invention provide enhanced steady-state activity for methanol oxidation relative to binary platinum-ruthenium alloys.

Figure 3:
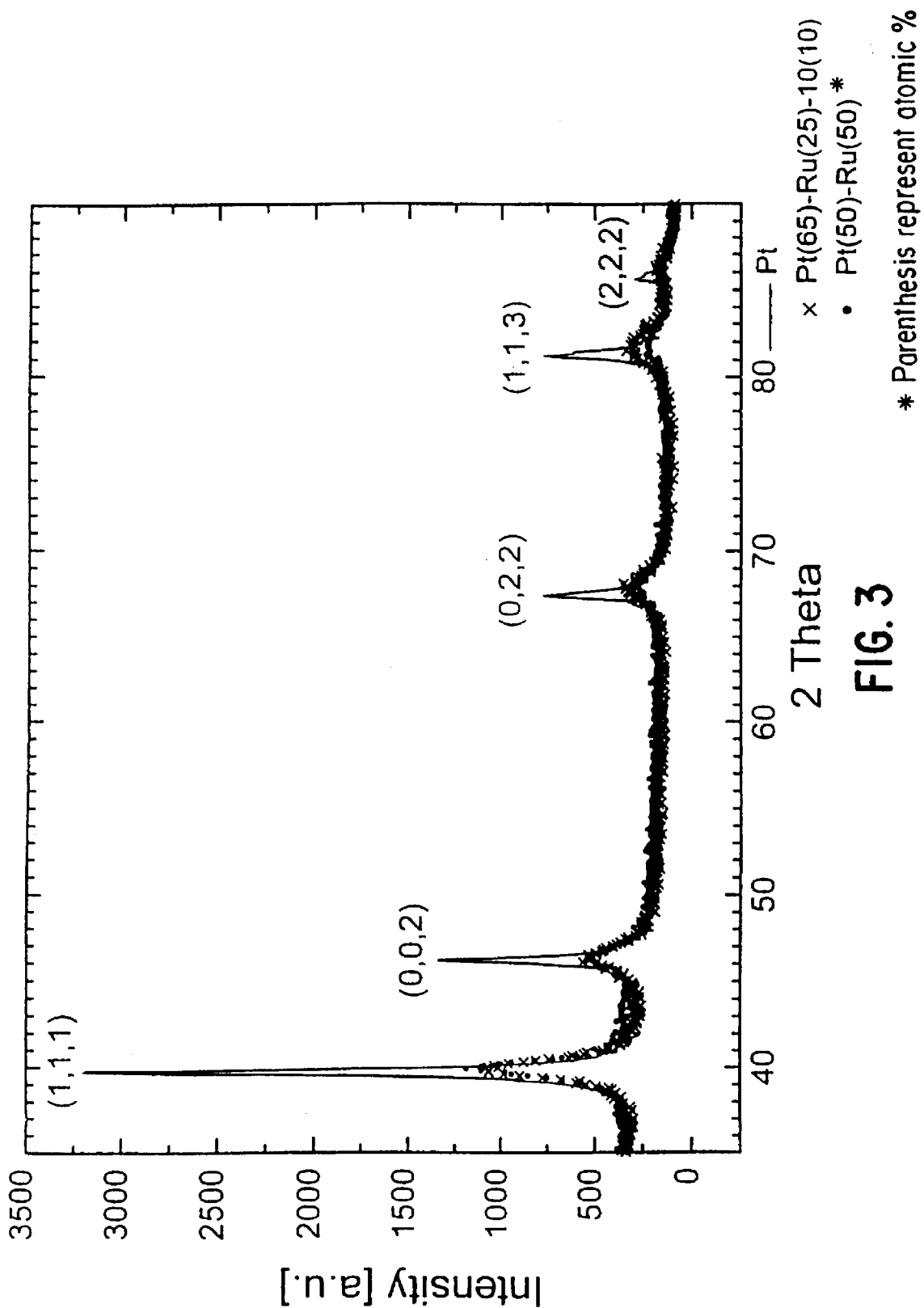
FIG. 3 shows the x-ray diffraction patterns of platinum catalyst ink, platinum(50%)/ruthenium(50%) catalyst ink and platinum(65%)/ruthenium(25%)/osmium(10%) catalyst ink.

FIG. 3 shows the x-ray diffraction patterns of platinum catalyst ink, platinum(50%)/ruthenium(50%) catalyst ink and platinum(65%)/ruthenium (25%)/osmium(10%) catalyst ink. Comparing the x-ray diffraction peaks of alloys with those of platinum, it is clear that all of the alloys' x-ray diffraction peaks shift slightly to higher angles, and no extra peaks associated with possible second phases are observed. This result indicates that both alloys are single phase and the lattice parameters are smaller than pure platinum, which is due to the alloying of small atoms of ruthenium and/or osmium into platinum. These inks were used in rotating disk electrode studies (FIG. 4) and as anode catalysts in full test liquid-feed direct methanol fuel cells (FIG. 5).

Figure 4:
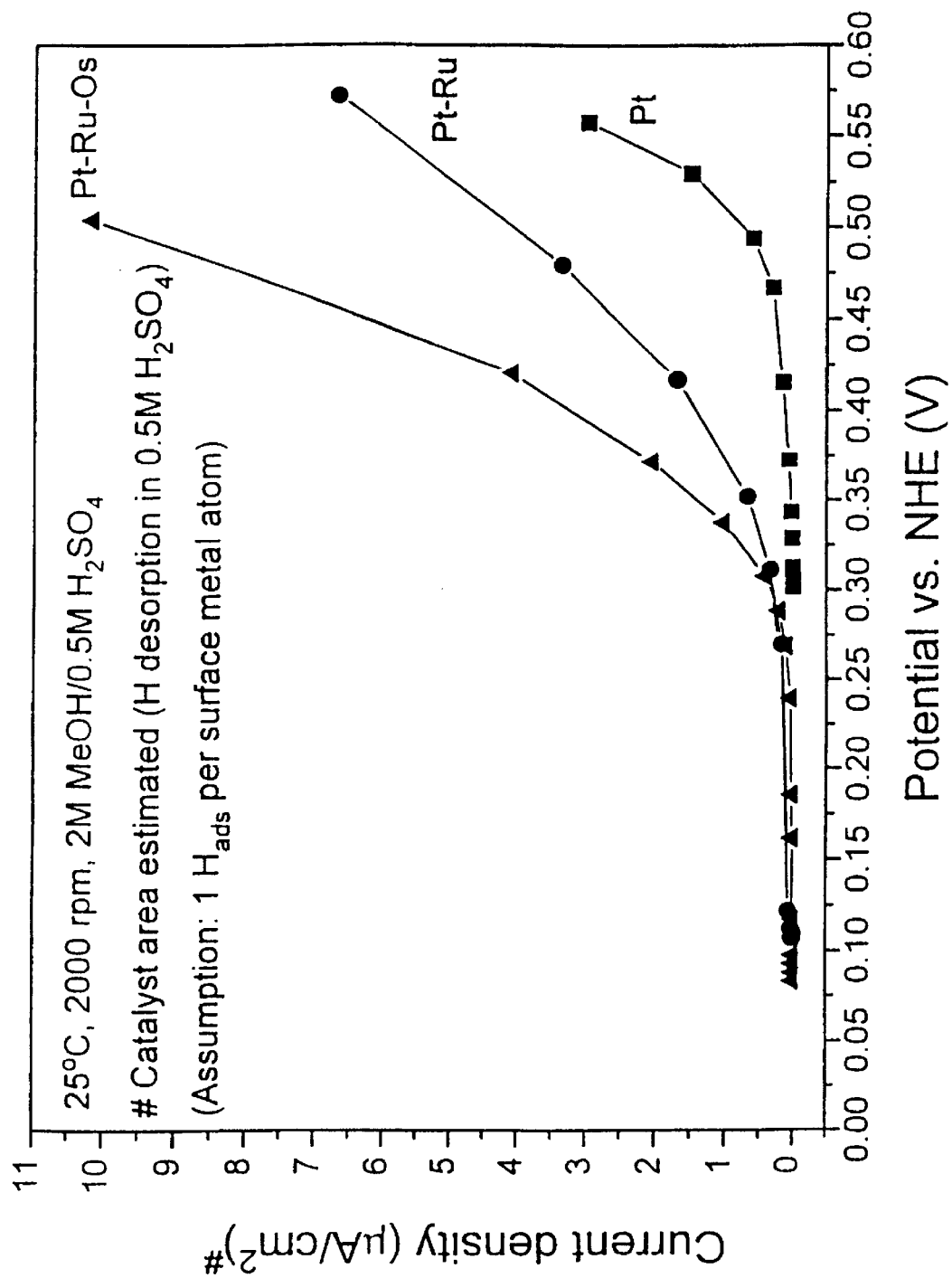
FIG. 4 shows the polarization curves of rotating electrocatalyst-ink disk electrodes with different catalyst inks.
Figure 5:
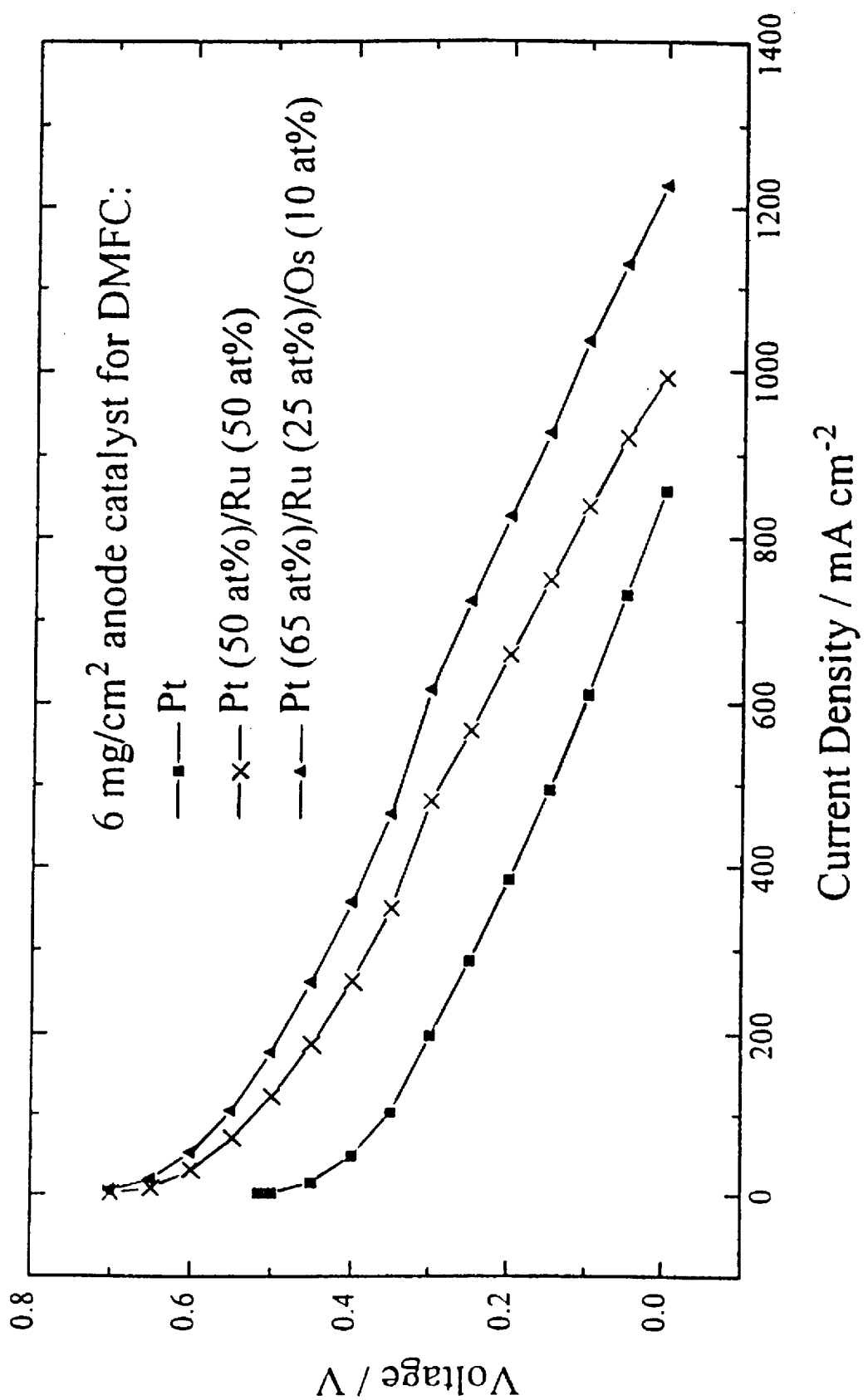
FIG. 5 shows the current-voltage curves of fuel cells with different anode catalysts.

FIG. 4 shows the polarization curves of rotating electrocatalyst-ink electrodes with different catalyst inks. In each case, the catalyst ink was painted on a glassy carbon rotating disk electrode and the electrode was then baked in an oven at 120° C. for one hour. The electrolyte was 2M MeOH (methanol) in 0.5M $H_2SO_4$ (sulfuric acid) at room temperature, 25° C. The current of the steady-state polarization curves acquired galvanostatically were normalized to the active area estimated from hydrogen desorption charges measured prior to tests in the methanol-containing solution.

FIG. 4 shows that the platinum-ruthenium-osmium ternary catalyst undergoes less polarization for the same current applied than both platinum-ruthenium and platinum. This demonstrates that the ternary catalyst composition of this invention provides superior steady-state activity for methanol oxidation compared to platinum-ruthenium catalysts.

Full liquid feed-direct methanol fuel cell tests were performed with different anode catalysts—platinum, platinum (50%)/ruthenium(50%), and platinum(65%)/ruthenium (25%)/osmium(10%). For all experiments, the anode catalyst loading was 6 mg/cm$^2$. For all tests, the cathode was platinum catalyst with 6 mg/cm$^2$ loading. The electrolyte was Nafion 117. The fuel was 0.5M methanol at 0 psig back pressure (ambient pressure) and the oxidant was dry oxygen. The cell temperature was maintained at 90° C. In order to eliminate mass transfer limitations in the experiments, high stoichiometric fuel and oxygen flow rates, and 10 psig oxygen back pressure were used to collect the data shown in FIG. 5. Examining the current-voltage curves of fuel cells with different anode catalysts in FIG. 5, it is clear that platinum(65%)/ruthenium(25%)/osmium(10%) is a better catalyst than platinum(50%)/ruthenium (50%).

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A catalyst composition for use in electrochemical reactor devices comprising: platinum (Pt), ruthenium (Ru), and osmium (Os) and having a single phase crystal structure comprising a face centered cubic unit cell.

2. A catalyst composition in accordance with claim 1, wherein, in atomic percentages, the amount of said platinum is greater than 40% and less than 100% of said catalyst composition, said ruthenium is greater than 0% and less than 60% of said catalyst composition, and said osmium is greater than 0% and less than 20% of said catalyst composition.

3. A catalyst composition in accordance with claim 2, wherein, in atomic percentages, said platinum comprises about 65% of said catalyst composition, said ruthenium comprises about 25% of said catalyst composition, and said osmium comprises about 10% of said catalyst composition.

4. In a direct oxidation fuel cell having an anode, a cathode and an electrolyte disposed between said anode and said cathode, the improvement comprising:

said anode comprising a catalyst composition comprising platinum (Pt), ruthenium (Ru), and osmium (Os), said catalyst composition having a single phase crystal structure comprising a face centered cubic unit cell.

5. A direct oxidation fuel cell in accordance with claim 4, wherein, in atomic percentages, the amount of said platinum is greater than 40% and less than 100% of said catalyst composition, said ruthenium is greater than 0% and less than 60% of said catalyst composition, and said osmium is greater than 0% and less than 20% of said catalyst composition.

6. A direct oxidation fuel cell in accordance with claim 5, wherein, in atomic percentages, said platinum comprises about 65% of said catalyst composition, said ruthenium comprises about 25% of said catalyst composition, and said osmium comprises about 10% of said catalyst composition.

* * * * *